Dec. 23, 1947.   J. C. CHENETTE   2,433,091
BOTTLE HOLDER
Filed Nov. 19, 1945
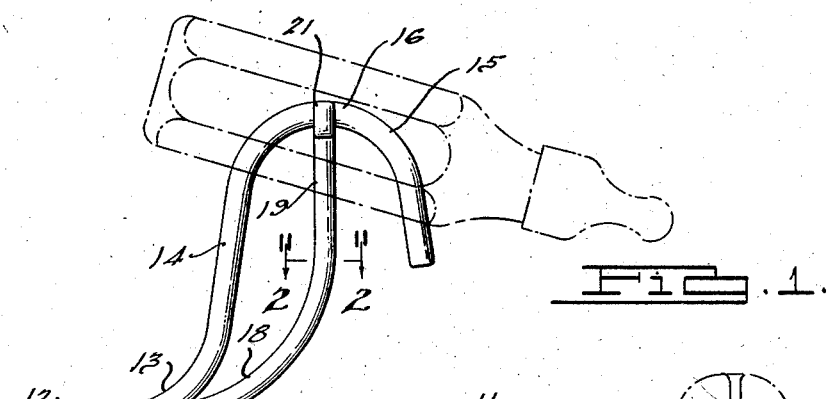
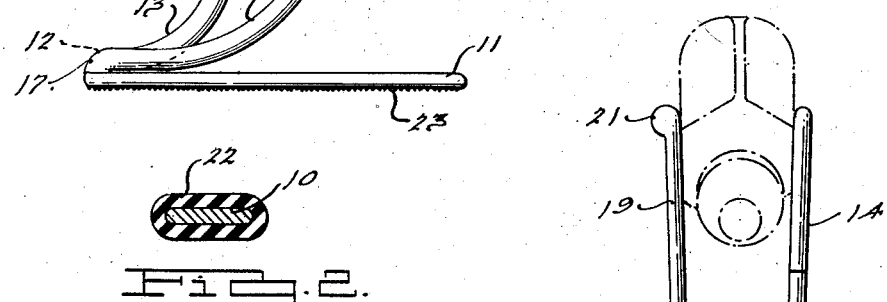
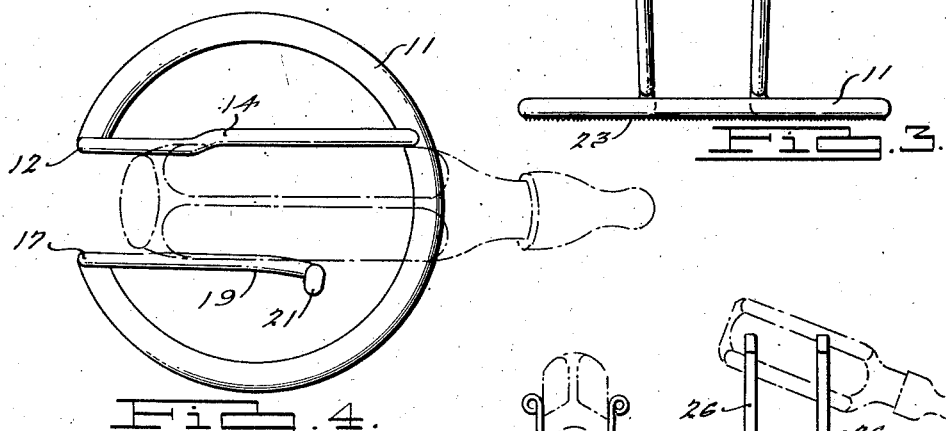
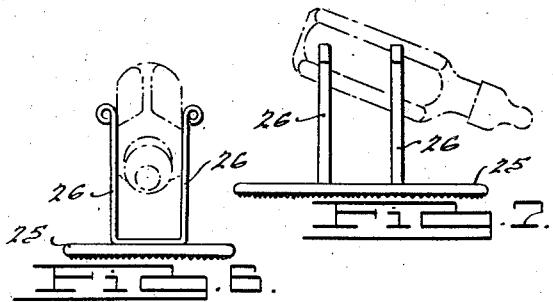
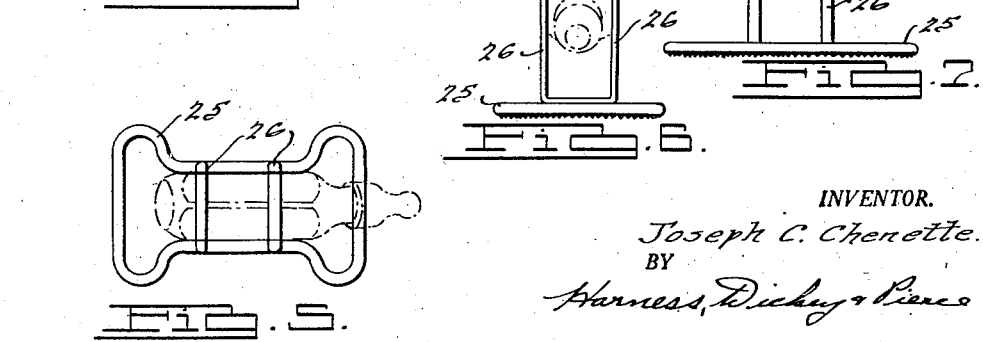
INVENTOR.
Joseph C. Chenette.
BY
Harness, Dickey & Pierce
ATTORNEYS.

Patented Dec. 23, 1947

2,433,091

UNITED STATES PATENT OFFICE 2,433,091

BOTTLE HOLDER

Joseph C. Chenette, Flat Rock, Mich.

Application November 19, 1945, Serial No. 629,488

2 Claims. (Cl. 248—107)

This invention relates to bottle holders, and particularly to a holder for a milk bottle which may be disposed at any desirable height and angle so that the nipple on the bottle mouth is in position to be accessible to a baby.

Various devices have been employed heretofore for supporting a baby's milk bottle in a position so that the baby may feed itself. Difficulty was usually experienced in supporting the device against tilting and the devices usually lacked the adjusting feature by which the milk bottle may be shifted in height and tipped at a desired angle.

The present invention embodies a holder which is made from wire or a flat strap to form a base of a shape and size sufficient to provide stability thereto. Upwardly extending arms are spaced apart a predetermined distance for receiving and clamping the bottle. The arms are so constructed that the bottle may be disposed at different heights from the base and may be tilted to any desired angle relative thereto. The wire or rod is preferably coated with a resilient material such as organic or synthetic rubber and the like, and the bottom face of the base is preferably corrugated to provide a gripping surface.

The device is extremely stable and will support the bottle at a predetermined height and at an angle to permit all of the milk in the bottle to be directed into the nipple. This eliminates the mother's constant vigilance to make certain that the baby is feeding upon the milk within the bottle and not sucking on the air thereabove which occurs when the bottle is not properly held.

Accordingly, the main objects of the invention are: to provide a holder having a base which provides stability and offers resistance against slippage while maintaining a bottle at a predetermined angle and height relative to the base; to form a base from strip of material of predetermined shape and size, which material is extended upwardly therefrom to form arms between which a bottle is supported; to form a base and bottle-supporting arms from a length of material which is covered with rubber or like resilient substance having a roughened surface for securely gripping the bottle and supporting it at a predetermined height and angle and for preventing the base from shifting on its support; to form a circular base from a rectangular strip the ends of which are extended upwardly therefrom to provide spaced arms which are coated with a resilient substance for gripping the bottle therebetween at a desired height and angle relative to the base; and, in general, to provide a supporting device for a bottle which is simple in construction and economical of manufacture.

Other objects and features of novelty of the invention will be specifically pointed out or will become apparent when referring, for a better understanding of the invention, to the following description taken in conjunction with the accompanying drawing, wherein:

Figure 1 is a view in elevation of a bottle holder embodying features of this invention;

Fig. 2 is an enlarged sectional view of the structure illustrated in Fig. 1, taken on the line 2—2 thereof;

Fig. 3 is an end view of the structure illustrated in Fig. 1;

Fig. 4 is a plan view of the structure illustrated in Fig. 1;

Fig. 5 is a plan view of structure, similar to that illustrated in Fig. 4, showing a further form which the invention may assume;

Fig. 6 is an end view of the structure illustrated in Fig. 5; and

Fig. 7 is a side view of the structure illustrated in Fig. 5.

The bottle holder of the present invention, as illustrated in Figs. 1 to 4, is made from a single strip of material 10 which is herein illustrated as being rectangular in shape having rounded corners. The cross section of the strip may have any desired dimension and the strip is herein illustrated as having a dimension of approximately ⅛" by ⅜". The strip is preferably made from spring or cold rolled steel and is formed into a base portion 11 which is herein illustrated as being circular in shape. It is to be understood that the shape of the base is not to be considered as limited to the circular form but that it may be made rectangular, oval or of any desired form so long as it is of sufficient size to provide stability against tilting.

One end of the strip 10 is bent upwardly at 12 and formed inwardly on an arc 13 and upwardly at 14 and reversely bent at 15 to form a gripping jaw 16. The other end of the strip 10 is bent upwardly at 17 and inwardly and upwardly on an arc 18 to form the clamping arm 19 having a rolled end 21. The holder formed in this manner is then preferably coated with a material 22 which may be rubber of the natural or synthetic type or any plastic or other material which will provide a gripping surface.

A rubber coating 22 was successfully applied to the strip in the conventional manner, as follows. A product Vocalox was first painted, dipped, sprayed or otherwise applied to the surface of the strip 10 and was permitted to dry thereon. After drying the device was dipped in latex which coagulated thereon when dipped in warm water for approximately four hours. This provided a bond of the latex to the surface of the strip 10 and the coating of desired thickness was then obtained by dipping the device in the latex and retaining it therein for a predetermined time. When left in the latex approximately twenty minutes, a coating of $\frac{1}{16}''$ was applied to the device. The latex was coagulated thereafter by placing the device in an oven and heating it to approximately 135° in the presence of moisture which was in the form of steam, the resulting humidity of the oven being controlled in a conventional manner.

This coagulation was completed in approximately three hours, after which the device was placed upon a plate having a corrugated surface to produce corrugations 23 in the bottom face of the coating on the base 11 of the device. An element having corrugated faces could have been placed between the jaw 16 and the arm 19 to provide similar corrugations thereon to increase the gripping capacity of the jaw and arm. The device was then placed in an oven having a temperature of approximately 185° to cure the coagulated latex which required approximately twelve hours. The corrugated plate was clamped to the base while the latex was being cured to prevent the corrugations in the latex from being distorted when resting on the floor of the oven.

The material 22 completely covers the surface of the strip 10 and provides gripping faces for the bottom 11, the jaw 16 and the arm 19 which prevent the device from shifting on a supporting surface and which securely clamp the bottle between the jaw and the arm. The bottle is held between the jaws at an adjusted height from the base and at a desired angle so that assurance is had that all of the milk in the bottle will be fed into the nipple throughout the time of feeding the baby.

In Figs. 5, 6 and 7, a further form of the invention is illustrated, that wherein a base 25 is made from a strip of material, such as the strip 10, from which the pair of upwardly projecting spaced arms 26 are provided for gripping the bottle at a desired height and angle above the base. The base and arms are coated with the material 22 in the same manner as the holder illustrated in Figs. 1 to 4 and substantial stability is provided to the device by the elongated type of base. The structure of Figs. 5, 6 and 7 illustrates how the shape of the holder may be varied while providing the feature of supporting the bottle at a desired angle and height above the base. It is to be understood that the exact shape of the holder as illustrated in Figs. 1 to 7 is not limiting and that various shapes and dimensions may be employed while providing the clamping feature for the bottle and the gripping feature of material covering the base as well as that of the arms and jaws.

What is claimed is:

1. In a holder for a bottle, a base portion made of a strip of material shaped in predetermined form and size to provide stability, one end of said material being extended inwardly and upwardly and reversely bent downwardly to form a jaw, the other end of the material being extended inwardly and upwardly in spaced relation to the said jaw for forcing a bottle thereagainst for securely supporting the bottle at various heights and angles relative to the base.

2. A holder comprising a rectangular base, a pair of spaced U-shaped elements secured to said base with the legs of the U-shaped elements extending upwardly in spaced relation forming gripping arms for a bottle.

JOSEPH C. CHENETTE.

REFERENCES CITED

The following references are of record in the file of this patent:

UNITED STATES PATENTS

| Number | Name | Date |
|---|---|---|
| 1,239,109 | Klauberg | Sept. 4, 1917 |
| 1,737,468 | McAnaney | Nov. 26, 1929 |
| 2,041,332 | Golden | May 19, 1936 |
| 2,243,870 | Klaus | June 3, 1941 |
| 2,288,442 | Felton | June 30, 1942 |